(12) United States Patent
Babakian

(10) Patent No.: US 11,204,791 B2
(45) Date of Patent: Dec. 21, 2021

(54) DYNAMIC VIRTUAL MACHINE NETWORK POLICY FOR INGRESS OPTIMIZATION

(71) Applicant: Nicira, Inc., Palo Alto, CA (US)

(72) Inventor: Andrew Babakian, Sydney (AU)

(73) Assignee: NICIRA, INC., Palo Alto, CA (US)

( * ) Notice: Subject to any disclaimer, the term of this patent is extended or adjusted under 35 U.S.C. 154(b) by 1450 days.

(21) Appl. No.: 14/788,573

(22) Filed: Jun. 30, 2015

(65) Prior Publication Data

US 2017/0005923 A1 Jan. 5, 2017

(51) Int. Cl.
*G06F 9/455* (2018.01)
*H04L 29/08* (2006.01)
*H04L 29/12* (2006.01)

(52) U.S. Cl.
CPC ........ *G06F 9/45558* (2013.01); *H04L 69/324* (2013.01); *H04L 69/325* (2013.01); *H04L 61/2007* (2013.01); *H04L 61/6004* (2013.01)

(58) Field of Classification Search
CPC ..... H04L 41/0893; H04L 45/24; H04L 45/44; H04L 45/74; H04L 45/586; H04L 47/20; H04L 47/125; H04L 61/103; H04L 61/2007; H04L 61/2061; H04L 69/324; H04L 69/325; G06F 9/455; G06F 9/45558; G06F 2009/45595
See application file for complete search history.

(56) References Cited

U.S. PATENT DOCUMENTS

| | | | | |
|---|---|---|---|---|
| 2005/0129019 A1* | 6/2005 | Cheriton | ............. | H04L 63/0272 370/392 |
| 2006/0184999 A1* | 8/2006 | Guichard | ................ | H04L 45/00 726/3 |
| 2011/0310812 A1* | 12/2011 | Gage | ..................... | H04W 40/24 370/329 |
| 2014/0237100 A1* | 8/2014 | Cohn | .................... | H04L 61/103 709/223 |

* cited by examiner

*Primary Examiner* — Marsha D Banks Harold
*Assistant Examiner* — Dharmesh J Patel
(74) *Attorney, Agent, or Firm* — Adeli LLP

(57) ABSTRACT

A method of performing ingress traffic optimization for active/active data centers. The method creates site-specific grouping constructs for virtual machines that run applications that are advertised to the external networks. The site specific grouping constructs provide an abstraction to decouple virtual machines from traditional networks for common ingress network policies. Each site-specific container includes a list of the virtual machines currently located at the site as well as a unique identifier of the site. Each virtual machine in a container is identified through the abstraction of metadata tag, logical data center objects, or the virtual machine's unique name. The IP address of each virtual machine is retrieved from the guest operating system and a network policy is generated to advertise the IP addresses of the virtual machines to the site's routing peer.

20 Claims, 11 Drawing Sheets

DYNAMIC VIRTUAL MACHINE NETWORK POLICY FOR INGRESS OPTIMIZATION

BACKGROUND

Software defined data centers (SDDCs) virtualize the physical network to provide isolated virtual networks for respective tenants. The innovations in virtual machine mobility live migrations from a networking perspective have allowed virtual machines to extend Open Systems Interconnection (OSI) model Layer 3 boundaries. Based on the specific use cases, the creation of active/active data centers allows inter-site reachability by emulating layer 2 technologies such as Overlay Transport Virtualization (OTV) or Virtual Extensible LAN (VXLAN) as well as the ability to dynamically migrate virtual machines between sites.

One challenge in supporting live migration is that active/active data centers have site-specific routing domains that form adjacency to the local Internet peer. This is a complication because specific virtual machine applications that are required to attract traffic externally could be subject to migration to a secondary site, which causes suboptimal ingress paths. Another challenge is that ingress tunnel techniques with existing solutions such as Locator/Identifier Specification Protocol (LISP) require specific hardware elements with proprietary line cards that are placed throughout routing domains to create location mappings.

BRIEF SUMMARY

Some embodiments provide a method of performing ingress traffic optimization for active/active data centers. The method creates site-specific grouping constructs for virtual machines that run applications that are advertised to the external networks. A grouping construct can include any type of network, compute, or security constructs. In some embodiments, one or more of the compute constructs, network constructs, and security constructs can be specified as dynamic grouping constructs that can have members dynamically added and/or removed from them. The virtual machines at each site are associated with the site-specific grouping constructs. Each site-specific grouping constructs includes a list of the virtual machines currently located at the site as well as a unique identifier of the site. Each virtual machine in a grouping construct is identified by a unique identifier such as a metadata tag or the virtual machine's unique name. The IP addresses of each virtual machine is retrieved from the guest operating system and a network policy is generated to advertise the IP addresses of the virtual machines to the site's routing peer.

Each site is associated with a network. A virtual machine that is provisioned at a first site is assigned an IP address in the network associated with the first site. When the virtual machine migrates from the first site to a second site that is associated with a different network, the virtual machine's unique identifier is removed from the first site's grouping construct and is added to the second site's grouping construct. The network policies for the first and second sites are updated such that the IP address of the virtual machine is removed from the first site's routing peer advertisement and is advertised along with the IP addresses of other virtual machines at the second site by the second site's routing peer. As a result, the ingress packets addressed to VM are directly received at the second site's routing peer despite the fact that the virtual machine's IP address belongs to a different network than the network at the second site.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method of ingress traffic optimization in a network virtualization environment. Virtualization is the ability to simulate a hardware platform, such as a server, storage device or network resource, in software. A virtual machine (VM) is a software implementation of a machine such as a computer. Network virtualization provides a software-based view of the hardware and software networking resources such as logical switches, routers, firewalls, load balancers, and virtual private networks (VPNs) to connected workloads. The virtual networks are programmatically created, provisioned and managed, while the underlying physical networks are responsible for forwarding the packets. Network and security services are allocated to each VM according to its needs, and stay attached to the VM as the VM moves among hosts in the virtualized infrastructure domain.

Figure 1:
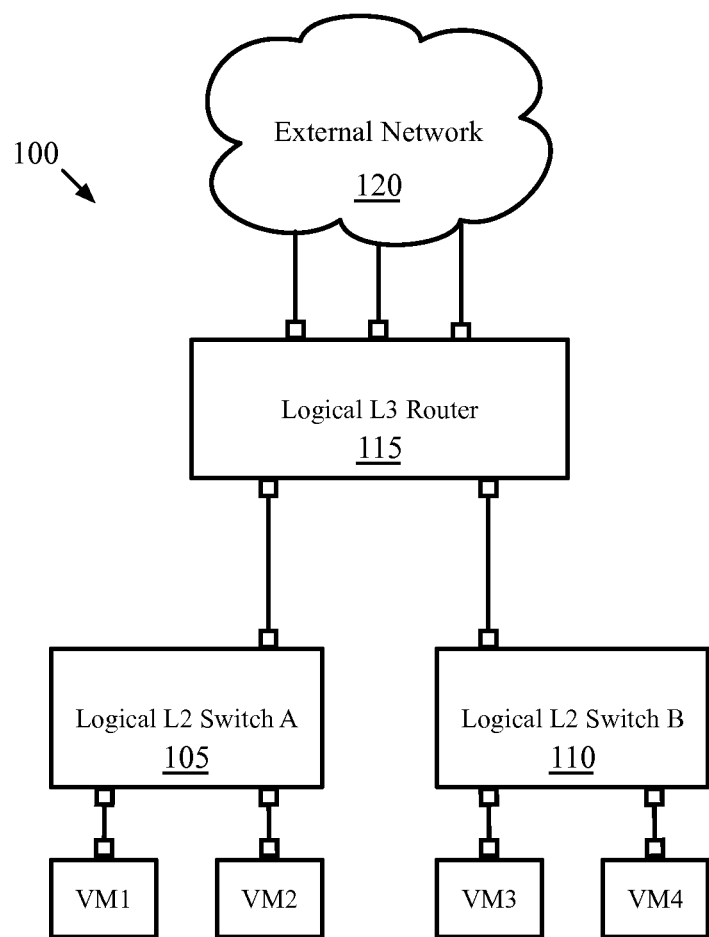
FIG. 1 conceptually illustrates a logical network architecture of some embodiments that includes a logical router.

FIG. 1 conceptually illustrates an example of a logical network architecture 100. The logical network 100 includes two logical forwarding elements (LFEs) 105 and 110 and a logical router 115. Each of the LFEs 105 and 110 connects several virtual machines. In this example, two virtual machines (VMs) are connected by each LFE and the logical router 115 connects the two LFE (i.e., logical layer 2 domains) together. In addition, the logical router connects the logical network to an external network 120, via three logical ports. While in this example, the logical router 115 has several ports connecting to the external network (e.g., as uplink ports). In some embodiments the logical router only has a single port that connects to the external networks.

In some embodiments, the logical network is an abstract conception of a network generated by an administrator, and the logical network is implemented in a virtualized, distributed manner in a managed physical infrastructure (e.g., in a multi-tenant datacenter). That is, the virtual machines that connect to the LFEs may reside on various different host machines within the infrastructure, and physical forwarding elements (PFEs) (e.g., software virtual switches) operating on these host machines implement some or all of the logical forwarding elements (logical switches, logical routers, etc.). In the virtualization field, some refer to software switches as virtual switches as these are software elements. However, in this specification, the software forwarding elements are referred to as PFEs, in order to distinguish them LFEs, which are logical constructs that are not tied to the physical world. A PFE forwards packets in a physical network whether or not it is implemented in software while an LFE forwards packets in a logical network, which is logically decoupled or abstracted from the physical network. In other words, the software forwarding elements are referred to as PFEs because they exist and operate in the physical world, whereas an LFE is a logical representation of a forwarding element that is presented to a user when designing a logical network.

A logical router, such as logical router 115, connects a set of LFEs to which VMs logically attach. Each LFE represents a particular set of IP addresses (i.e., a subnet), and is implemented in the managed network across a set of PFEs to which the VMs physically connect (e.g., through virtual interfaces). In some embodiments, the logical routers are implemented in a distributed fashion as well by the PFEs that connect to the virtual machines. However, when the logical router also connects to the external network via one or more ports, these connections to the external network are implemented through the use of one or more gateways. The gateways, in some embodiments, are responsible for both sending data traffic from the managed network to the external unmanaged physical network and processing traffic sent from the external network into the managed network.

Figure 2:
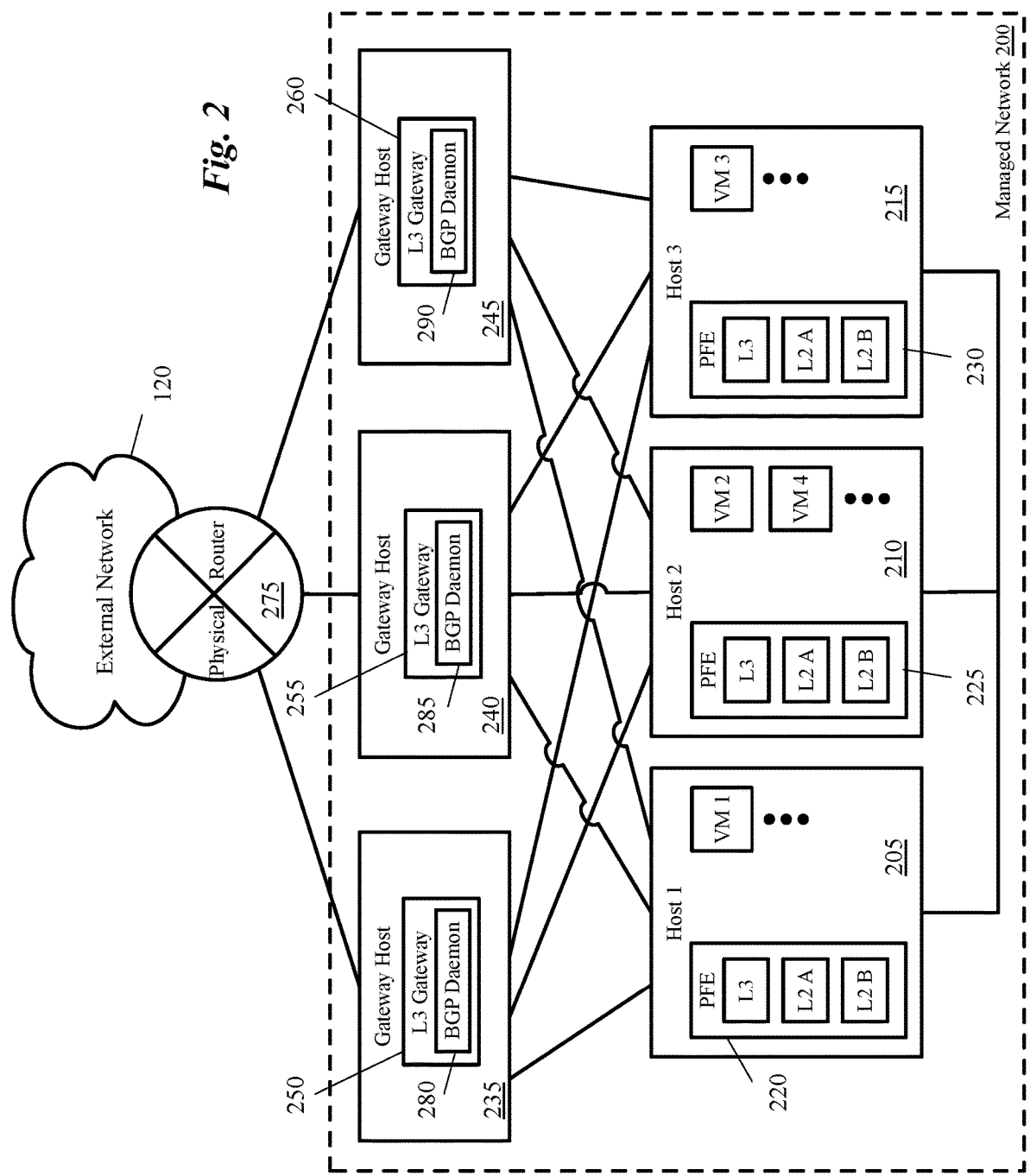
FIG. 2 conceptually illustrates a physical implementation of the logical network of FIG. 1.

FIG. 2 conceptually illustrates such a physical implementation of the logical network 100. This figure illustrates a managed network 200 that includes three host machines 205-215 and three gateway host machines 235-245. The VMs of the logical network 100 reside on the hosts 205-215, implemented on top of virtualization software (e.g., a hypervisor, virtual machine monitor, etc.) that operates in the host. Additional virtual machines that connect to other logical networks may reside on some or all of these hosts, as well as additional hosts in the managed network that are not shown in this figure.

In addition to the virtual machines, each of the hosts 205-215 operates a physical forwarding element (PFE) 220-230. In some embodiments, this PFE is a virtual switch that operates within the virtualization software of the host (e.g., Open VSwitch, or another software forwarding element). In the example illustrated in FIG. 2, the PFEs 220-230 each implement both of the LFEs 105 and 110, as well as the logical router 115. This enables first-hop logical processing in some embodiments, in which all or most of the logical processing for a packet is performed at the first PFE that receives the packet. Thus, a packet sent from VM 1 to VM 4 would be processed, by the PFE 220, through LFE 105 to logical router 115 and then to LFE 110. The PFE 220 would identify the logical egress port of LFE 110 for the packet as the port to which VM 4 attaches, and map this egress port to a tunnel to the PFE 230 at host 210.

In some embodiments, a network controller (or controller cluster) provisions the PFEs 220-230 by generating flow entries, or data tuples that the PFE converts into flow entries. These flow entries specify matching conditions (e.g., physical ingress port, logical ingress port, destination MAC or IP addresses, transport layer 5-tuples, etc.) and actions to take on a packet that matches the conditions (e.g., assign packet to a LFE, assign a logical egress port, write data to register, encapsulate in a particular tunnel, etc.). Thus, in order for the PFE to process a packet through the logical network, the PFE matches the packet to a first flow entry, performs the action (e.g., to modify the packet or store logical context data in a register for the packet), resubmits the packet in order to match another flow entry, etc.

The gateway host machines 235-245 of some embodiments host L3 gateways 250-260 for the logical network 100 that implement the connections between the external network 120 and the logical network 100 (specifically, the logical router 115). When the physical router 275 receives a packet with a destination address that corresponds to one of the VMs of the logical network 100, or a public IP shared by the VMs on a logical switch, the physical router 275 sends the packet to one of the gateway hosts 235-245. The gateway hosts 235-245 also include PFEs, and in some embodiments these PFEs receive packets from the physical router 275 and hand off the packets to the L3 gateway in their respective host for processing.

In some embodiments, a user (e.g., an administrator) configures the logical network 100. Upon receiving such a configuration with several logical router ports connecting to the external network, a network controller (or controller cluster) selects the set of gateway host machines 235-245 for implementing this connection. Specifically, some embodiments select a different gateway host machine for each of these logical router ports. In some embodiments, these gateways are spread across clusters of gateways in the network, such that each port is implemented in a different failure domain. The network controller calculates a routing table for the logical router, a portion of which is implemented at the gateway host machines and a portion of which is implemented by the PFEs (e.g., the PFEs 220-230 and those on the gateway host machines 235-245).

The L3 gateways 250-260 implement the portion of the routing table of the logical router 115 for north-south traffic (i.e., traffic sent into and out of the managed network). Some embodiments only handle ingress traffic, with outgoing traffic sent through other means (e.g., by a direct connection between the PFEs in the host machines 220-230 and the physical router 275 or other network elements in the external network 120). In other embodiments, the L3 gateways handle both ingress and egress traffic.

As shown, the L3 gateways 250-260 each include a Border Gateway Protocol (BGP) daemon 280-290. These daemons 280-290 peer with the external physical router 275 and advertise routes to this router for the logical router 115. In some embodiments, the BGP daemons 280-290 operates in the same way as a traditional physical router in terms of its exchange of information with its neighbors. For example, these BGP daemons may open a BGP session with the physical router 275, send keep-alive messages as specified by the protocol, and advertise its routes to the physical router 275 via BGP packets. In some embodiments, the BGP daemons also receive BGP packets sent by the physical router 275, and uses these packets to identify routes. The BGP daemons of some embodiments either install the routes in their local routing tables (i.e., within the same namespaces), push the routes up to the network controller so that the network controller can calculate new routing tables for all of the L3 gateways implementing the logical router, or a combination thereof. In other embodiments, however, the BGP daemon only effectively works in one direction, sending out routes to its neighbors (to attract ingress traffic) but not installing routes received from those neighbors. That is, the BGP daemon neither pushes the received routes up to the network controllers nor installs the routes in the routing table at the local gateway.

In some embodiments, the peering of the L3 gateways with the physical router(s) is a user-specified property of the logical ports. In some embodiments, when the user (e.g., administrator) specifies for the logical router to peer with external routers, the controller generates routing protocol data based on the logical network configuration. For each port of the logical router that faces the external network, the controller identifies (i) the set of external routers with which the gateway implementing the port will peer (that is, its neighbors) and (ii) the set of routes that the gateway implementing the port will advertise. These routes may be simply the IP prefixes representing the logical switches that connect to the logical router, or may additionally include other routes input by the user or dynamically generated by processes that implement the logical router. In some embodiments, different ports of the logical router may advertise their routes to different external network routers. Once the network controller generates this data, along with the routing table data for the L3 gateway, the network controller distributes the data to the gateways (e.g., through a hierarchy of network controllers).

In some embodiments, the L3 gateways 250-260 are virtualized containers that have the ability to store a routing table, such as namespaces. In addition, the BGP daemons 280-290, or other routing protocol applications, operate within these containers according to the data received from the controllers. One or more daemons may operate on the gateway host machine outside of the containers (e.g., in the virtualization software of the gateway) in order to receive data tuples from the controller that define both the routing tables and the BGP configuration for a particular namespace. This daemon or daemons operate to instantiate the namespace, provision the namespace with the routing table, and start the BGP daemon in the namespace. In addition, the daemon(s) generate a configuration file for the BGP daemon in some embodiments, and store the configuration file (e.g., in a file system of the host machine) for access by the routing protocol application. Upon installing its configuration file, the BGP daemons begins communication with its external router neighbors.

In the example shown in FIG. 2, multiple gateways 235-245 that implement the same logical router 115 (e.g., implementing different ports) advertise the same routes (e.g., to reach VMs on the logical switches 105 and 110) to the same edge network element such as external router 275. The external router, in some embodiments, views these multiple L3 gateways as equal-cost next-hops for packets sent to the advertised addresses. As such, the external routers in some embodiments spread packets sent to those destinations across the various gateways that advertise the routes. The external routers may use any of a variety of different equal-cost multi-path (ECMP) techniques to determine to which gateway a packet should be sent.

In the above-described embodiments, the routing protocol application resides inline. That is, the application operates on the gateway, which is the location through which packets are sent. In some embodiments, however, the network controller(s) act as a route server for the gateways, and the routing protocol application resides on the controller. In this case, the routing protocol configuration is not distributed to the gateways by the controller, but instead used to instantiate the routing protocol application on the controller. The controller then advertises the routing information to the external routers (and potentially receives advertised routing information from the external routers). This advertised information informs the external routers as to which gateways to use for which routes. As in the inline case, the external routers may use ECMP techniques to distribute packets sent to the logical network between the several gateways.

Figure 3:
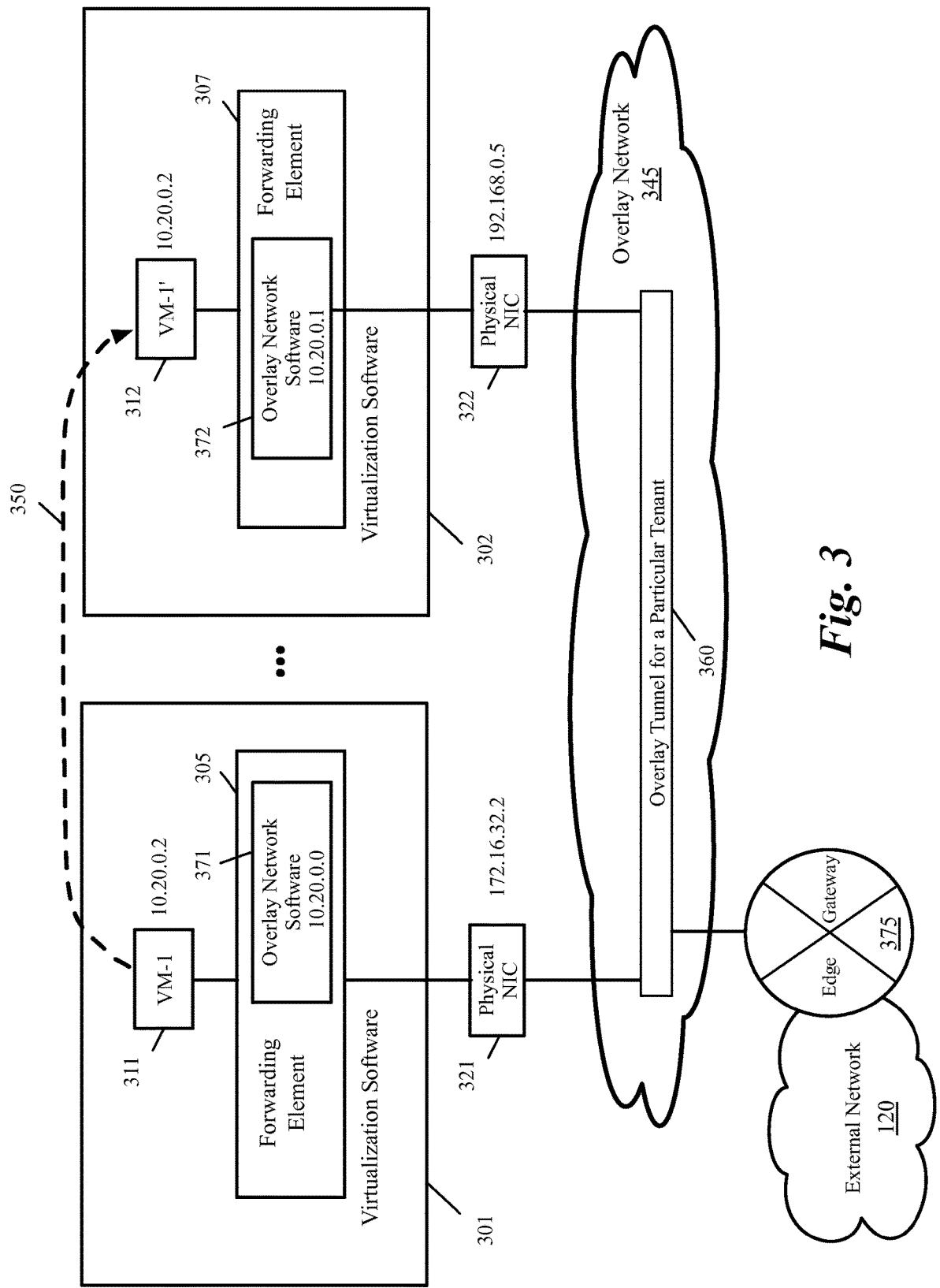
FIG. 3 conceptually illustrates migration of a VM from a host to another in some embodiments when the two hosts are not connected to the same subnet.

One aspect of virtualization is the ability to live migrate VMs from one host computer to another without turning off the VM. Live (or stateful) migration enables dynamic load balancing among the physical host machines. In addition, live migration allows scheduled maintenance of hosts by migrating the VMs from a host before the host is taken offline for maintenance. FIG. 3 conceptually illustrates migration of a VM from a host to another in some embodiments when the two hosts are not connected to the same subnetwork (subnet). For simplicity, other VMs hosted by hosts 301-302 and some components of the virtualization software are not shown. The examples of embodiments of the invention are described below using Internet Protocol (IP) addresses. However, the same principles apply to any network protocol that uses packet routing.

An IP address includes two fields: a network prefix and a host identifier. The network prefix is the most significant portion of the IP address and identifies where a device is connected (e.g., identifies a router at the edge or the entry point of a network). The host identifier identifies who the host is (e.g., identifies an individual device or interface on a particular network). All devices in the same network (or subnet) have the same network prefix. The network prefix is expressed in Classless Inter-Domain Routing (CIDR) notation, which expresses the network prefix followed by a slash character ("/"), followed by the length of the prefix in bits. For instance, in Internet Protocol Version 4 (IPv4) the IP addresses include 32 bits and 172.16.0.1/20 indicates that 20 bits of the IP address are allocated for the subnet and the remaining 12 bits are used to identify individual hosts on the subnet. In the following discussions, IPv4 IP addresses are used in several examples. The discussions are similarly applicable to other IP protocols such as Internet Protocol version 6 (IPv6).

In the example of FIG. 3, physical NICs 321 and 322 are connected to each other through an overlay network 345. An overlay network is a network virtualization technology that achieves multi-tenancy in cloud computing environment. Examples of overlay networks include Virtual eXtensible LAN (VXLAN), Generic Network Virtualization Encapsulation (GENEVE), and Network Virtualization using Generic Routing Encapsulation (NVGRE). For instance, VXLAN is an OSI model Layer 2 (L2) overlay scheme over a Layer 3 (L3) network. VXLAN encapsulates an Ethernet L2 frame in IP (MAC-in-UDP encapsulation) and allows Virtual Machines (VM) to be a part of virtualized L2 subnets operating in separate physical L3 networks. Similarly, NVGRE uses Generic Routing Encapsulation (GRE) to tunnel L2 packets over L3 networks. For brevity, the rest of this specification uses the example of VXLAN as an overlay network that is a Layer 2 overlay scheme over a Layer 3 network. It should be understood that other overlay networks (which, e.g., may use other encapsulation protocols) be implemented instead of those specifically mentioned here.

VXLAN uses MAC Address-in-User Datagram Protocol (MAC-in-UDP) encapsulation to extend Layer 2 segments across a data center network. The MAC-in-UDP adds a VXLAN header to the original payload (i.e., the Layer 2 frame) and encapsulates them in a UDP-IP packet. The MAC-in-UDP encapsulation is then used to tunnel Layer 2 network over Layer 3 network.

As a part of the VXLAN configuration, a virtual tunnel endpoint (VTEP) is configured on every host. The VTEPs are used to map tenants' end devices to VXLAN segments and to perform VXLAN encapsulation and decapsulation. Each VXLAN network is assigned a unique identifier referred to as virtual network identifier (VNI). Each host VTEP is assigned a unique IP address. The VTEP uses this IP address to encapsulate Ethernet frames and transmit the encapsulated packets to the transport network through the IP interface.

In some embodiments, a host that participates in overlay network includes overlay network virtualization software that covers the configuration/control plane, data plane and overlay network packet processing functionality. The hosts include (e.g., as a part of the forwarding element 305-307 software) the overlay network virtualization software 371-372 that acts as a tunnel end point. In the example of VXLAN overlay network, the overlay network virtualization software is referred to as VXLAN Virtual VTEP software and the tunnel end point is known as VTEP. There is a unique identifier associated with each instance of an overlay network. The unique identifier associated with each VXLAN network is referred to as the VXLAN Network Identifier (VNI). The overlay network software 371-372 are responsible for maintaining a mapping table to include, e.g., VM media access control (MAC) to tunnel end point address and other address mappings. The overlay network traffic between a tenant's VMs that are hosted on separate hosts is passed through a tunnel 360 through the overlay network 345.

The overlay network 345 is connected through an edge network element such as an edge gateway 375 to the external network 120, which may include the Internet, local area networks (LANs), wide area networks (WANs), different hardware equipment such as cables, routers, switches, etc. Although the overlay network endpoints 371-372 are shown as a part of the corresponding forwarding elements 305-307 in the embodiment of FIG. 3, in other embodiments the overlay network endpoint is implemented as a virtual bridge in the virtualization software 315, an overlay aware VM application, or an overlay network capable switching hardware.

The VMs of a tenant (only one shown) form a logical network (also referred to as private network or virtual network), which links tenant VMs on host 301 with tenant VMs on host 302. The logical network is an abstraction of a physical network and may provide a virtual Layer 2 (or data link layer) for services such as encapsulation and decapsulation of network layer data packets into frames, frame synchronization, medial access control, etc. The logical network may span one or more physical networks and be organized independent of the underlying physical topology and organization of the physical networks. The logical network is identified by a logical network identifier (also known as virtual network identifier or VNI). Each logical network is configured by a tenant.

As shown in FIG. 3, VM-1 311 that is hosted by host 301 is migrated (as shown by the arrow 350) to host 302. A copy, VM-1' 312, of VM-1 is created on host 302. The routing tables associated with the hosts are updated to indicate the presence of the VM's MAC address at the new site.

Once VM-1' starts running on host 302, VM-1 is taken offline and live migration is complete. In the example of FIG. 3, VM-1 311, Host 301, and physical NIC 321 are on the same subnet, 172.16.32.0/20. On the other hand, host 302 and physical NIC 322 are on a different subnet, 192.168.0.0/24.

Live migration of VM-1 311 from host 301 to host 302 requires that all network services be available to VM-1' 312 at the new host 302. In order not to reconfigure the VM on the new host, the packets sent to the VM at address 172.16.32.0 have to be delivered to the VM at the new site. The overlay network tunnel endpoints 371 and 372 are on the same subnet 10.20.0.0/24. As a result, although VM-1' 312 with IP address 10.20.0.2 is hosted on host 315 that is on a different subnet, the packets addressed to 10.20.0.2 are delivered to the new location of the VM (i.e., VM-1') through the overlay network. VTEP 372 delivers the packets to forwarding element 207, which in turn delivers the packets to VM-1' 312.

Utilizing the system of FIG. 3 in an active/active data center causes several challenges. Active/active data centers provide disaster recovery by creating and storing real-time (live) copies of data. Active/active data centers, however, have site-specific routing domains that form adjacency to the local routing peer. The adjacency is from the edge network element to the site-specific physical network element, which then advertises the routes over IP wide area network (WAN) or other External networks. This is a challenge as VM live migration takes place, the advertisement of the route for the site-specific element will still attract traffic to the original VM, which has already been migrated causing sub-optimal path.

Network virtualization uses encapsulations as a transport mechanism between layer 3 boundaries. This mechanism creates reachability through the respective tunnel encapsulation between sites. As described below, some embodiments create a new method that is consumed through management application programming interfaces (APIs). The method automates provisioning of applications, which require to be advertised to site-specific WAN and Internet. Coupling this method with the existing functionality of network virtualization creates a novel function to perform ingress traffic optimization between active/active data centers over an agnostic transport network.

Another challenge is that ingress tunnel techniques with existing solutions such as Locator/Identifier Separation Protocol (LISP) require specific hardware device and proprietary line cards placed throughout routing domains to create location mapping. While the solution provided by LISP was effective in traditional networking, the manual aspects of creating LISP enabled nodes is not required in network virtualization as the functionality architecturally shifts the network decision making closer to applications. Furthermore, LISP is dependent on specific network hardware and line cards. Manual configuration of roles is also required to identify LISP sites with the respective namespaces/mappings, as well as non LISP sites (i.e., external networks). The LISP approach requires network elements in the data path to be LISP enabled which makes ingress traffic engineering solutions very challenging to be infrastructure agnostic.

Some embodiments provide a novel method of performing ingress traffic engineering for active/active data centers while utilizing a network virtualization solution. Some of these embodiments classify the site residencies of VMs (i.e., the physical site or data center where a VM resides) that run applications that are required to be advertised to external networks (or to internal/corporate networks) across private routing domains using VPN's or Layer 2 extensions to other sites (e.g., data center sites and branch office sites). The VMs are associated with a site-specific grouping construct that is advertised through a dynamic routing policy. The method simplifies ingress optimizations without the need for manual configuration within the network domains and provides abstractions through y placing homogeneous applications in grouping constructs irrespective of the corresponding subnet and location.

I. Dynamic Virtual Machine Network Policy for Ingress Optimization

Figure 4:
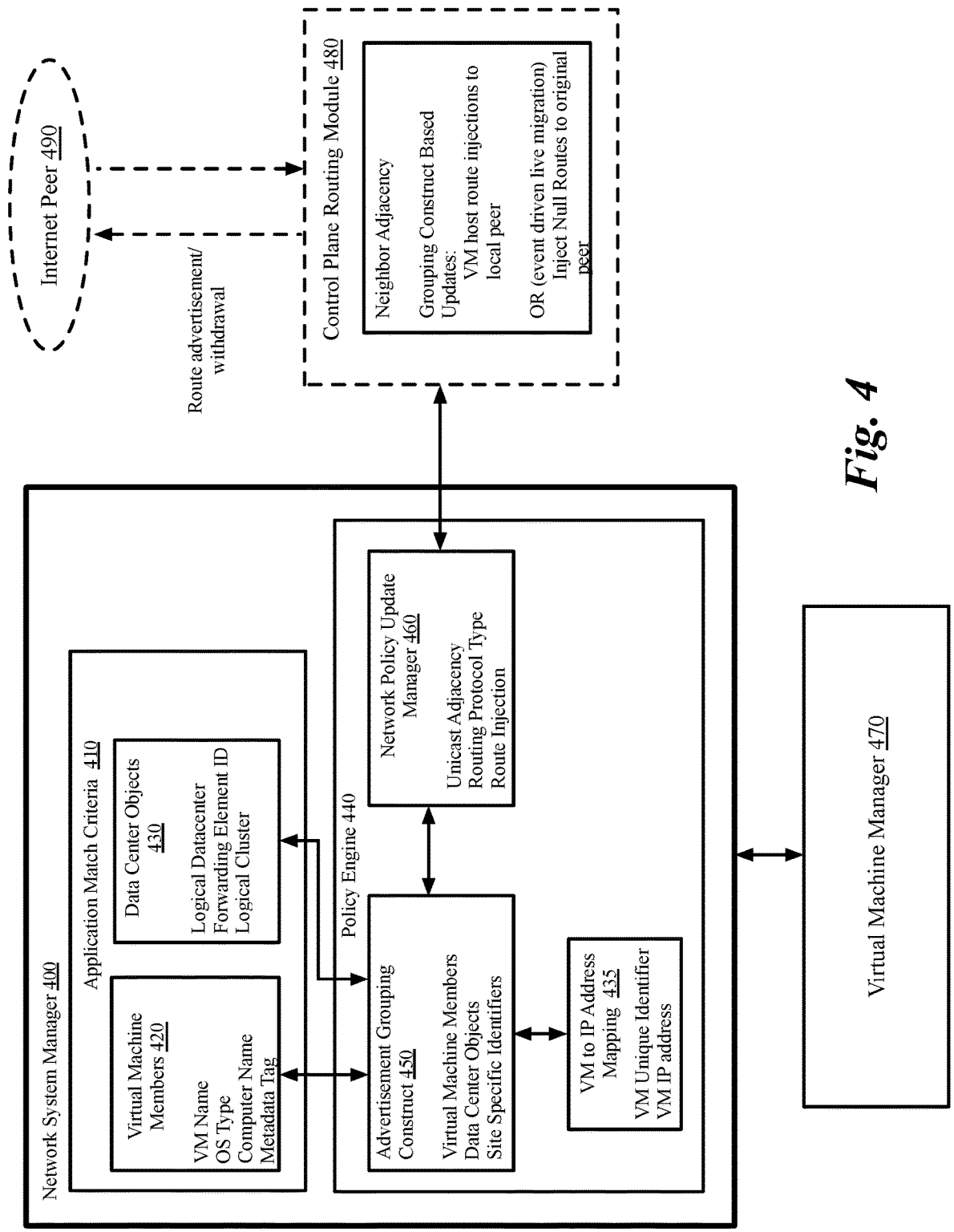
FIG. 4 conceptually illustrates a system for classifying the site residencies of VMs and advertising the VMs routes through a dynamic routing policy in some embodiments of the invention.

FIG. 4 conceptually illustrates a system for classifying the site residencies of VMs and advertising the VMs' routes through a dynamic routing policy in some embodiments of the invention. As shown, the system includes a network system manager 400. Network system manager 400 utilizes an application match criteria 410 and a policy engine 440. For simplicity the following discussions assume there is a one-to-one correspondence between the VMs and the applications that run on the VMs and need to be advertised to external networks or internal/corporate networks (i.e., networks in a different subnet). However, when there is not a one-to-one mapping between these applications and VMs (i.e., multiple external facing applications are running on a VM), the TCP/IP protocol stack is utilized to identify the applications. Since each externally facing applications requires a different IP address, the IP address of each application is utilized to identify the application and satisfy the application match criteria. Some embodiments provide a guest agent (a process that runs inside the guest) that are utilized to retrieve the IP address of each application. The guest agent provides visibility within a VM's guest operating system to network information such as IP address, domain name system (DNS) name, etc.

As an example, in a classic three tier application (i.e., presentation tier (or web application), application tier (or business logic), and data tier (or database)), only the frontend presentation tier is externally facing. Once the frontend (or web) application is qualified by meeting the criterion of the application match criteria, the VM identification is passed to an advertisement grouping constructs (or advertisement group) for ingress optimization. A grouping construct is a construct that can include any type of network, compute, or security constructs. Each grouping construct has an identifier. The advertisement grouping construct in some embodiments includes VM members identifiers, data center objects, site specific identifiers, etc. In some embodiments, one or more of the compute constructs, network constructs, and security constructs can be specified as dynamic grouping constructs that can have members dynamically added and/or removed from them. In some embodiments, a member is added to a grouping construct by adding an identifier of the member to the grouping construct. In FIG. 4, the unique identifier of VM is retrieved from the advertisement grouping construct and is sent to virtual machine manager 470, which then retrieves the VM IP address through the guest agent (e.g., virtual machine manager 470 sends a REST call that includes the unique identification of the VM to retrieve the VM IP address). The VM is then mapped with its unique identifier and IP address and populated in a table 455 within the advertisement grouping construct.

As shown in FIG. 4, application match criteria 410 includes a virtual machine members list 420 and a data center objects list 430. Policy engine 440 includes one or more advertisement grouping constructs 440, one or more network update policies managers 460, and a VM to IP address mapping list 435. As described below, the virtual machine members list 420 and data center objects list 430 are utilized to match against the advertisement grouping constructs 440.

The virtual machine members list 420 includes information that is used to uniquely identify a VM. The information includes one or more of the VM name, fully qualified domain name (FQDN) of the corresponding application, guest operating system (DNS, computer name), and metadata tag. The data center objects list 430 includes a list of logical datacenters, forwarding elements identifications, and logical clusters. The matching is done based on the characteristics of the VMs (e.g., VM name), guest operating system, metadata tags, and any related objects that connect to VMs such as forwarding elements, logical data centers, logical cluster, etc. For instance, if the application running on a VM is a web tier application, then the guest operating system is searched (e.g., by using the aforementioned guest agent) and the FQDN of the application is retrieved. As another example, if there is a metadata tag associated with the VM, the metadata string is put into the corresponding grouping construct as the unique identifier of the VM. Once a VM the unique identifier of a VM is included in an advertisement grouping construct, the unique identifier of the VM (being mapped to the FQDN, VM name, metadata, related objects connected to the VM, etc.) is retrieved from the grouping construct and is used to obtain the VM IP address (e.g., using the guest agent or derived through inspecting source IP field within packets from the virtual Ethernet port). For instance, if the VM is associated with metadata tag "Web-DMZ" and the VM is at site A, the VM identifier, which is created by the virtual machine manager, is put in site A grouping construct. The unique identifier can then be used to retrieve the IP address of the VM.

The application match criteria 410 is used to filter the specific applications that require network policy update policy. Not every application in different sites needs to be filtered, as some applications may not require network policy update (e.g., the application are not external facing). Also, some applications may be static and never subjected to change, therefore do not need network policy update. Some embodiments subscribe to events (i.e., adding/deleting/modifying of VMs) in advertisement grouping constructs. The subscription to these events is used to detect whether there has been live migration of VMs between sites. An event is created whenever a new VM is added to a grouping construct, the IP address of a VM is modified, or VM has been deleted from a grouping construct. These subscribed events are used to determine what network updates are needed per site. For instance, if the unique identification of a VM that was in Site A is added to the advertisement grouping construct of Site B, then this event will trigger the unique identification of the VM to be deleted from the advertisement grouping construct of Site A. The VM's routes are subsequently withdrawn from site A router and advertises into site B router.

The advertisement grouping construct 450 is a grouping construct that decouples applications from their physical network addressing. The advertisement grouping construct can be matched against the virtual machine members list 420 and/or data center objects list 430. Once a VM has a match to an advertisement grouping construct, the virtual machine physical residence is queried against the network systems manager 400 to complete the match.

Depending on the system configuration, placement of VMs in an advertisement grouping construct may require matching against a site-specific identifier (SSI), to ensure host route advertisement is performed at the local site. The SSI is an identification that maps VMs to a specific data center site. The SSI can be the virtualization software unique identification (e.g., the universally unique identifier (UUID) of the virtualization software), applied to each physical host (virtualization software/hypervisor). The SSI can also be location specific identifier applied to each physical host (virtualization software/hypervisor) to provide logical groupings between sites. The SSI is used to associate the VM to a specific site.

As an example, consider a system with two sites: site A (i.e., physical data center A) and site B (i.e., physical data center B). The system only requires two grouping constructs (one per site). Initially (i.e., before the live migration of any VM), all VMs in site A are associated with Site A grouping construct, and all VMs in site B are associated with site B grouping construct. If a virtualization design did not organize the elements such that it is possible to identify which host is in site A and which host is in site B through clustering definitions, then the SSI of the host is associated with the grouping construct. If the virtualization design did define each compute cluster or logical datacenter as belonging to Site A or Site B then there is no need for an SSI and the cluster/logical datacenter objects are utilized as conditional expression to determine the VM's physical Location.

After the live migration of a VM, one or more of the following matching criteria are checked to determine whether the VM remains in the same grouping construct or is moved to another grouping construct. The VM's name, metadata, FQDN, associated forwarding element, logical cluster, logical datacenter, etc., are used to determine the VM's current site. If the VM used to be in Site A and the matching criteria indicates that the VM has moved to Site B, then the VM is added to Site B grouping construct and removed from Site A grouping construct. Otherwise, if the matching criteria indicate that the VM has not moved to a new site (e.g., the live migration was done to a host in the same data center site) the VM remains in the same grouping construct. As the example shows, a grouping construct can have VMs that are on different subnets, i.e., the placement of the VMs in a grouping construct depends on the current site residency as opposed to the subnet associated with the VMs. In other words, the embodiments of the invention decouple the virtual local area network (VLAN) and subnets.

Once the application/VM is associated with a grouping construct, the unique identifier of the VM is retrieved from the grouping construct and is mapped to the VM IP address. As shown in FIG. 4, the VM to IP mapping list 435 is used to dynamically keep track of VM to IP address mapping per site. The VM to IP mapping is the key information needed to interact between the network policy update manager 460 and control plane routing module 480. Some embodiments maintain a VM to IP address mapping table 435 for each site (e.g., one table for Site A and one table for Site B). Each table can be viewed as a dictionary and holds a mapping of the VM's unique identification to VM's IP Address for the particular site.

The network policy describes what is required to be done when a VM requires a change in routing advertisement (i.e., when a VM is first provisioned, a VM is deleted, or a VM is moved from one site to another). The policy includes specific instruction to update the site-specific network element with /32 network prefix of the VM. The policy carries this information in a data-structure, which is communicated to the control plane routing module 480. The data structure has all the specific instructions such as forming unicast adjacency with site local border network element (which connects to the external/WAN network) as well as advertisement/withdraw messages.

In some embodiments a protocol such as border gateway protocol (BGP) is used, with autonomous system numbers, password, and other peering information. The network policy update manager 460 then interacts with control plane routing module 480 over the same API carrying BGP instructions to announce and withdraw network routes depending on the site residency of the VM. In other embodiments, the network policy update manager 460 communicates to the control plane routing module 480 using XML REST API to program the site-specific border network element.

In some embodiments, the network policy update manager 460 operates in four modes: (1) when new applications are provisioned, the network policy update manager 460 does the initial injection of routes, (2) if long distance live migration (i.e., VM migration from one subnet to another) takes place, the network policy update manager 460 withdraws routes from Site A and advertises in Site B, (3) if the VM IP address changes, the network policy update manager 460 re-advertises the VM address, and (4) if VM is deleted, the VM's prefix is also removed from the border router.

The advertisement grouping constructs group together the applications/VMs that require specific network advertisement to the site local peer irrespective of their traditional network segmentation/addressing. Route advertisement policy provided by the network policy update manager 460 is associated with the advertisement container 450 to create a list of VMs, which are required for network advertisement. The network policy update manager makes an API call to the control plane routing module 480 with the VMs' IP addresses which then advertises the route addition or withdrawal to the site-specific peer 490 through the preferred routing protocol (e.g., BGP). In an alternate embodiment, the network systems manager 400 has an API that has the data structure of the advertisement container, which then updates a hardware network device with the list of VMs that require advertisement to the Internet/WAN. The IP addresses of the VMs are retrieved, e.g., through the guest agent.

If an inter-site live migration occurs, the VM is queried against the SSI (or other unique identifiers such as data center logical cluster identification, etc.). If the SSI matches the alternate active site, the VM is included in the new site's advertisement container only (a VM cannot be a part of two network grouping constructs at the same time). The network systems manager 400 sends an update to the control plane routing module 480 to withdraw route entry to the first site and inject /32 host route to the new site.

Figure 5:
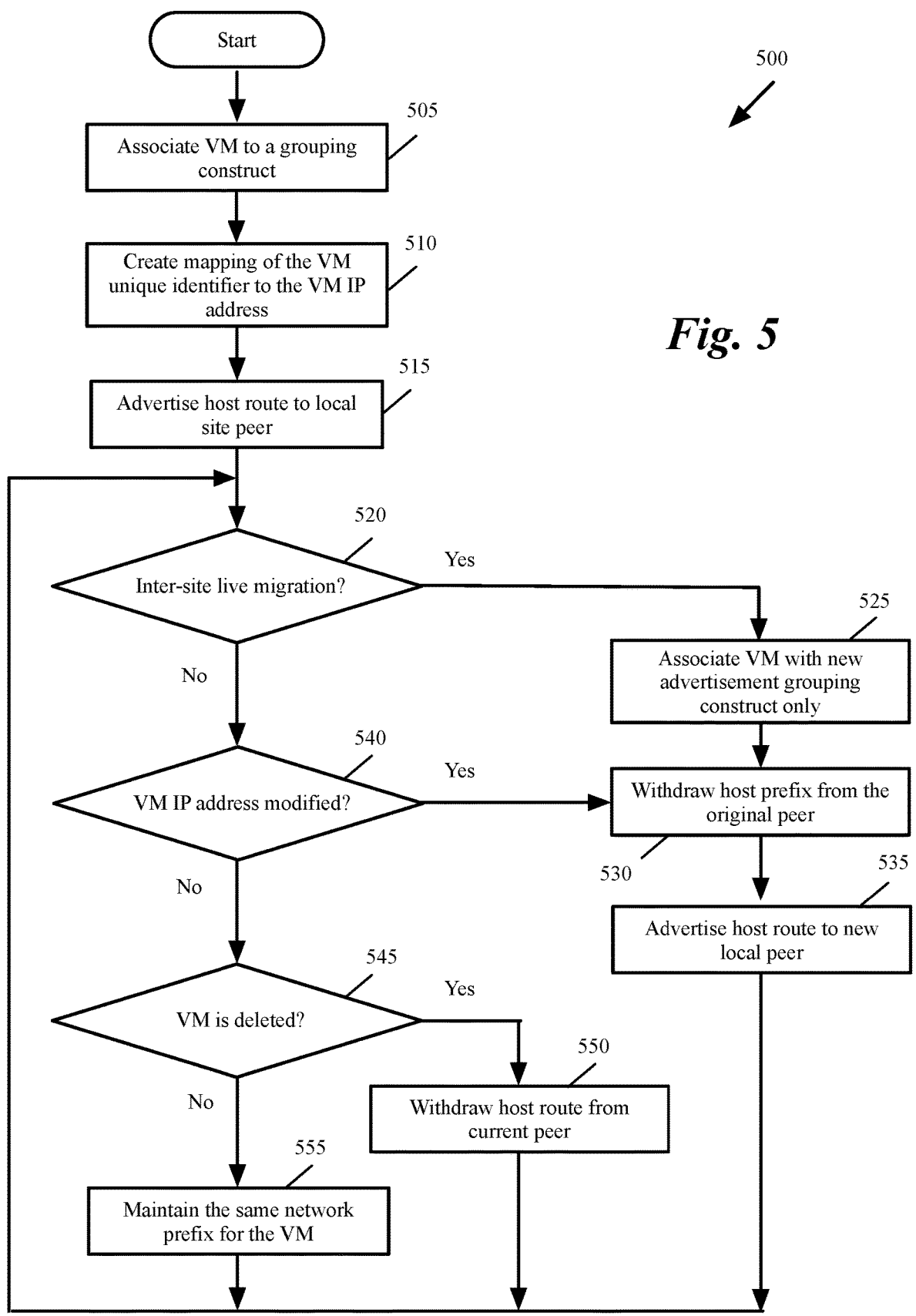
FIG. 5 conceptually illustrates a process for route advertisement in some embodiments of the invention.

FIG. 5 conceptually illustrates a process 500 for route advertisement in some embodiments of the invention when a VM is live migrated to a new site, the VM IP address is modified, or the VM is deleted from the site. Process 500 in some embodiments is performed by a network system manager (e.g., by policy engine 440 of the network system manager 400 in FIG. 4). As shown, the process associates (at 505) a VM to a container. The process then creates (at 510) a mapping of the VM's unique identifier to the VM IP address. The process then advertises (at 515) host route to the local site peer.

The process then determines (at 520) whether an inter-site live migration for the VM has occurred. In some embodiments, the process subscribes to the live migration events and is notified of live VM migrations. If the live migration has not occurred, the process maintains the process proceeds to 540, which is described below.

Otherwise, the process associates (at 525) the VM with the new advertisement container only (i.e., the process removes the VM from the previous site's container). The process then withdraws (at 530) the host prefix from the original routing peer. The process then advertises (at 535) the host route to the new local peer. The process then proceeds to 520, which was described above.

When the process determines that inter-site live migration has not occurred, the process determines (at 540) whether the VM IP address is modified. If yes, the process proceeds to 530, which was described above. Otherwise, the process determines (at 545) whether the VM is deleted. If yes, the process withdraws (at 550) the host route from the current peer. The process then proceeds to 520, which was described above. Otherwise, the process maintains (at 555) the same network prefix for the VM. The process then proceeds to 520, which was described above.

Different embodiments provide different options to extend the routing information to control plane routing module 480. Some embodiments detect the VMs that have migrated to a new site and inject /32 routes into the global routing table of the border network elements which face WAN or external network. In other embodiments (when less entries in the global routing tables are preferred), summary subnets e.g., /24 are advertised and if live migration occurs then /32 is advertised at the new site.

Figure 6:
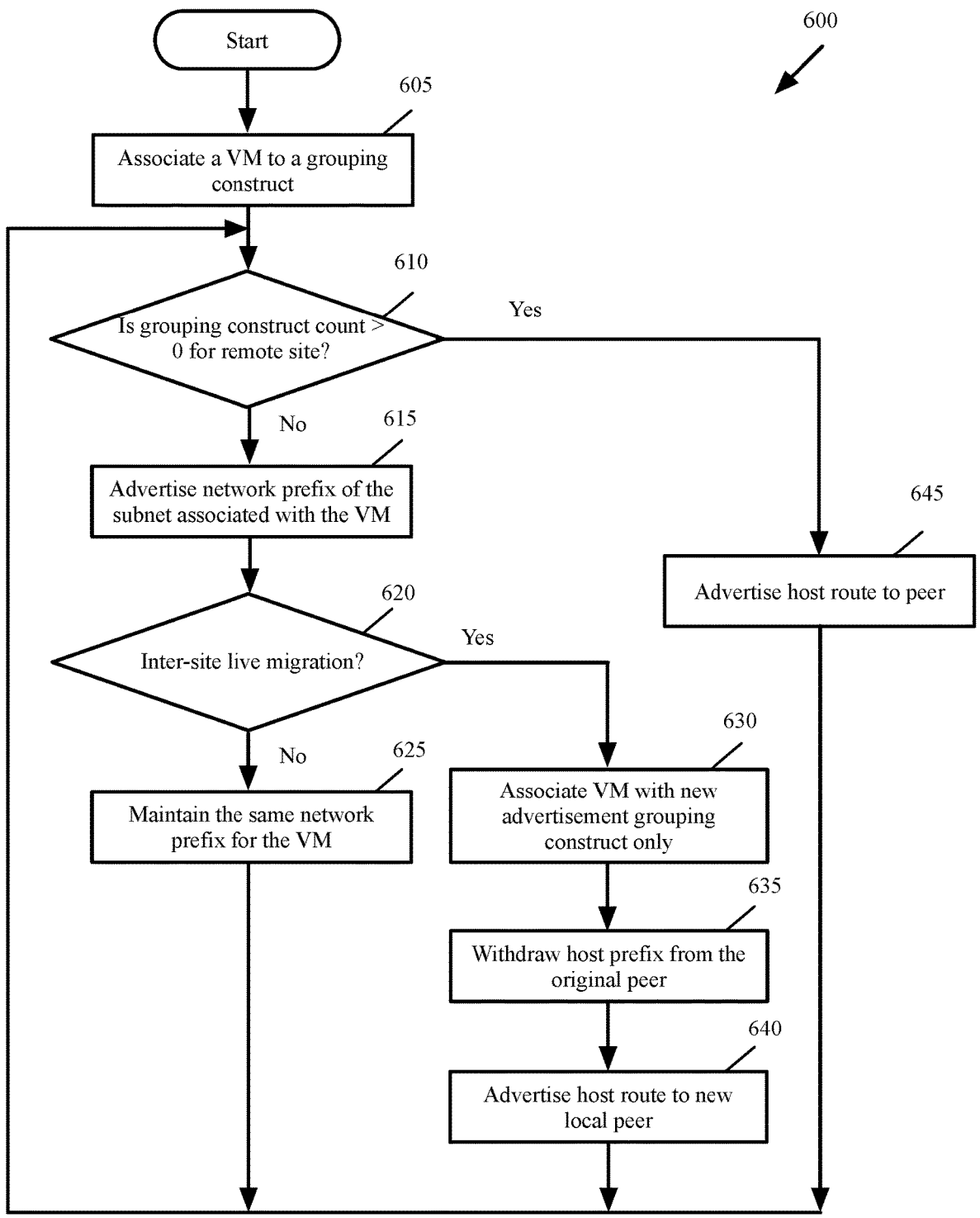
FIG. 6 conceptually illustrates an alternative process for route advertisement in some embodiments of the invention.

FIG. 6 conceptually illustrates an alternative process 600 for route advertisement in some embodiments of the invention. Process 600 in some embodiments is performed by a network system manager (e.g., by policy engine 440 of the network system manager 400 in FIG. 4). Process 600 is performed when VMs are added by default to a secondary site or for parsing the existing VMs, which happen to be at the secondary site. As shown, the process associates (at 605) a VM to a container. The process then determines (at 610) whether the container count (i.e., the VMs within the site container) for remote site is greater than zero. When the container count is greater than zero, the process advertises (at 645) the host route (i.e., the /32 address) to the site peer. The process then proceeds to 610, which is described above.

Otherwise, the process advertises (at 615) the network prefix of the subnet associated with the VM. The process then determines (at 620) whether an inter-site live migration for the VM has occurred. In some embodiments, the process subscribes to the live motion events and is notified of live VM migrations. If the live migration has not occurred, the process maintains the same network prefix for the VM (since the VM has not migrated to a different site). The process then proceeds to 610, which was described above.

Otherwise, the process associates (at 630) the VM with the new advertisement container only (i.e., the process removes the VM from the previous site's container). The process then injects (at 635) a Null route to or withdraws network prefix from the original routing peer. The process then advertises (at 640) the host route to the new local peer. The process then proceeds to 610, which was described above.

Figure 7:
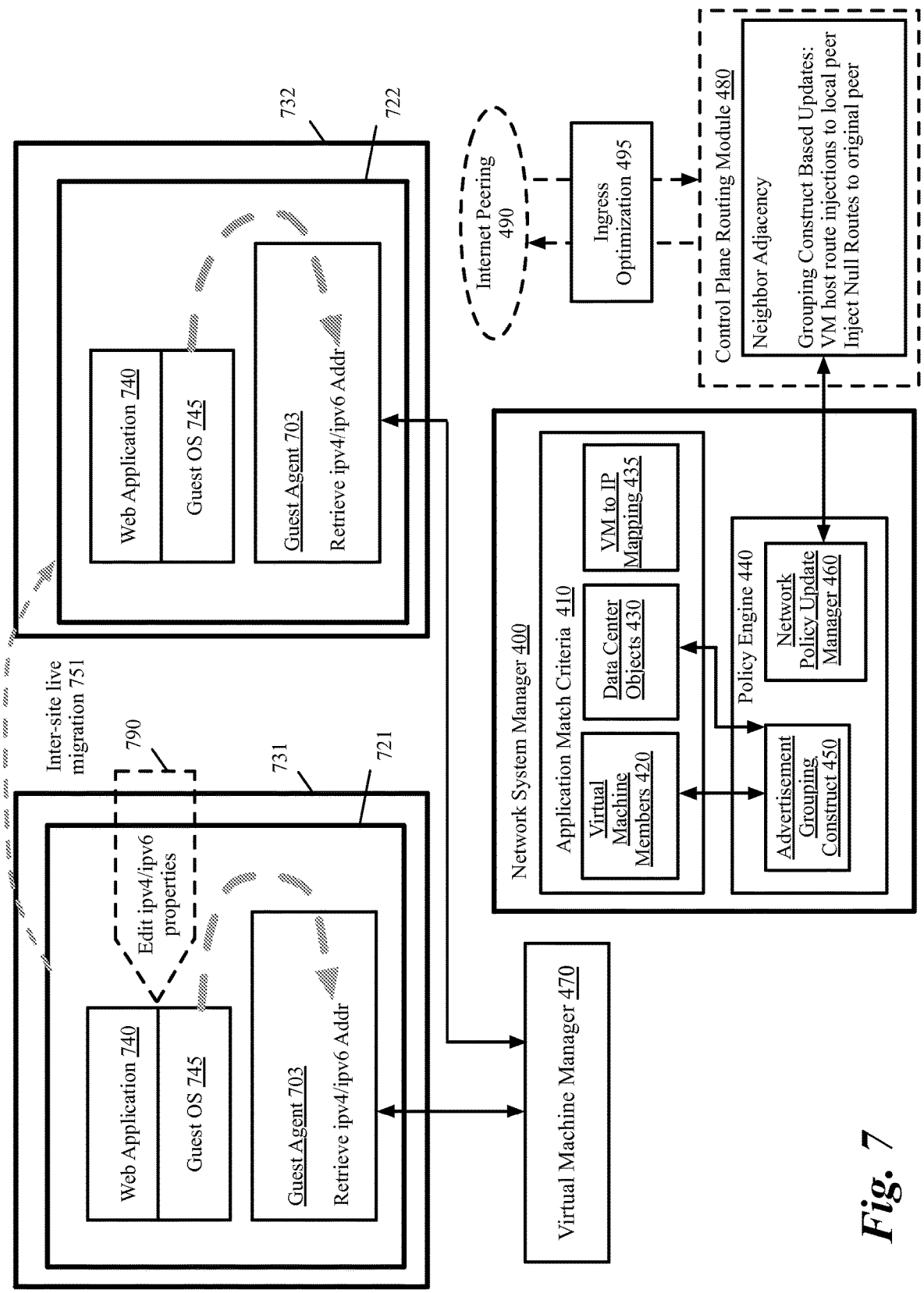
FIG. 7 conceptually illustrates a use case for live migration of a VM between two hosts located in two different subnets in some embodiments.

FIG. 7 conceptually illustrates a use case for live migration of a VM between two hosts located in two different subnets in some embodiments. As shown, a VM 721 is migrated (as shown by the line 751) from host 731 to host 732. A copy 722 of the VM is created on host 732. The VM includes a web application 740 and a guest operating system 745.

Each VM includes a guest agent 703. One advantage of the system described herein is the ability to identify VM IP addresses. Traditionally the virtual router or switch had to inspect packets and examine the source IP field within the IPv4 header to determine the VM IP address. The current invention however extracts a string data type through the guest agent to derive contextual data such as the VM IP address, DNS name, etc. VMs are then matched against the VMs' operating type, VM Name (start of string), custom metadata tags/labels, and different datacenter objects connected to the VMs including forwarding elements, clusters, data centers, etc. Once a container is defined that matches one or more of the above, a second query against the VMs that has matched the container is performed for the VMs' IP addresses through the guest agent. Another important aspect of the invention is maintaining site awareness. A site-specific identification can then match the container that could either be cluster identification or a specific host that is identified as a particular site. The route policy bound to this container is then injected by route advertisement. In another embodiment specific to route injection, an XML/REST based API with a potential physical networking element with decoupled control plane (that could be API driven) transports the defined application grouping constructs which allows to express routing injections.

Another advantage of the system described herein is the ability to update network advertisements in case the business user/administrator edits the IPv4 properties within the guest operating system. Prior art methods require manual network changes in the system configuration if the VM address is subject to change. As shown in FIG. 7, the IPv4 address is changed (as shown by 790) through the guest agent and due to its existing capability of matching against an abstracted format, the route policy then updates the physical elements on the /32 route.

Figure 8:
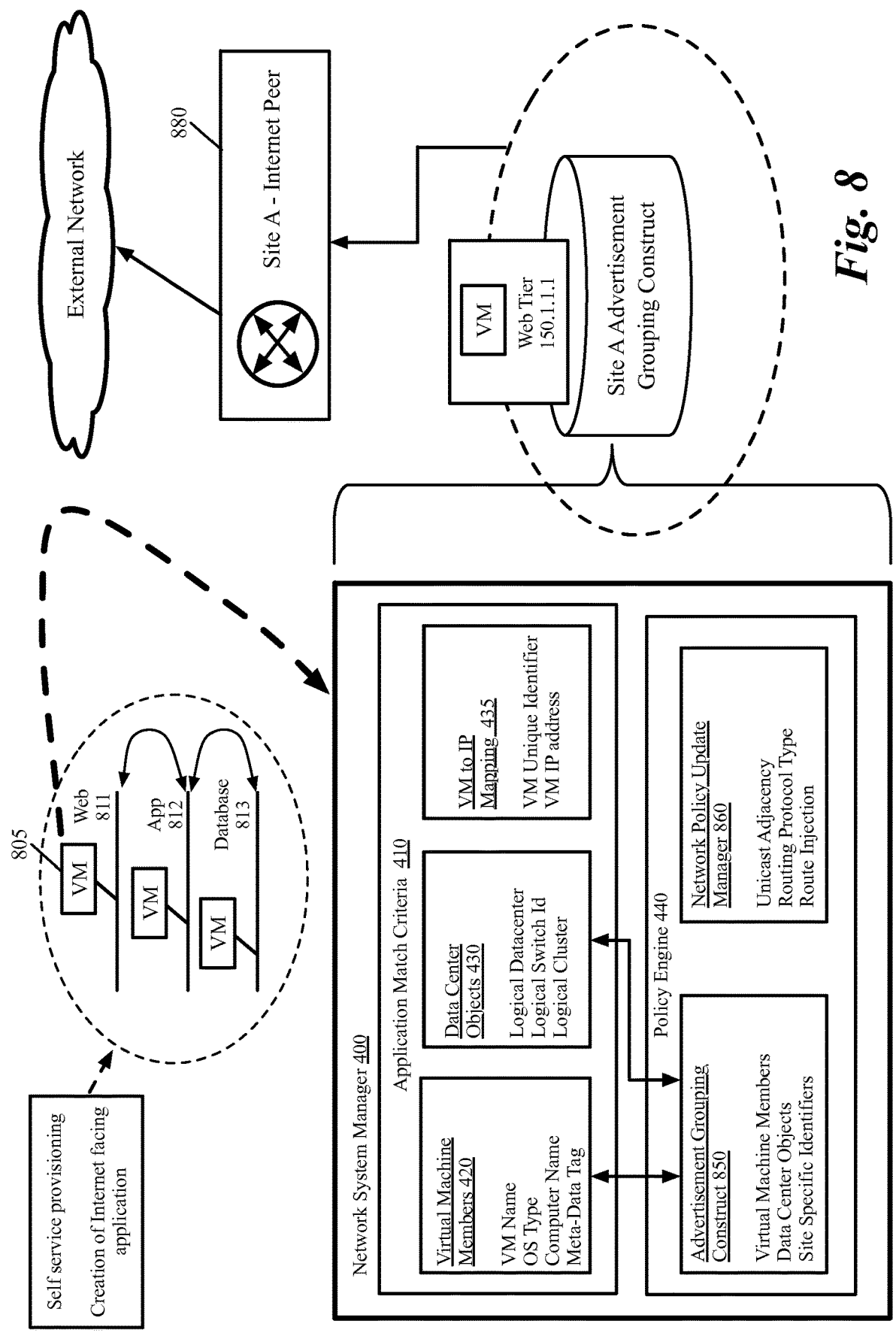
FIG. 8 conceptually illustrates a use case for providing network agility for the consumption of information technology services.

FIG. 8 conceptually illustrates a use case for providing network agility for the consumption of information technology (IT) services. A three-tier application 805 is provisioned. The three-tier application includes a presentation tier or web application 811, an application tier or business logic 812, and a data tier or database 813. Once the business user decides to use a dynamic network policy, VM 820 that runs the web application 811 is selected for dynamic network policy updates. The characteristics of the VM are used to classify the VM and place the VM in an advertisement container 850. In some embodiments, a central management API framework provisions VM applications using the respective advertisement policies. The API framework can be through Simple Object Access Protocol (SOAP) or Representational State Transfer (REST) to add, modify, or delete these grouping constructs.

Network policy update manager 860 then provides dynamic network policy updates (e.g., upon provisioning of the VM on a particular site or live migration of VM 805 to another site) for site advertisement to the Internet peer 880. As shown, the disclosed system provides flexibility within the consumption of IT services without the complexity and provisioning delay.

Figure 9:
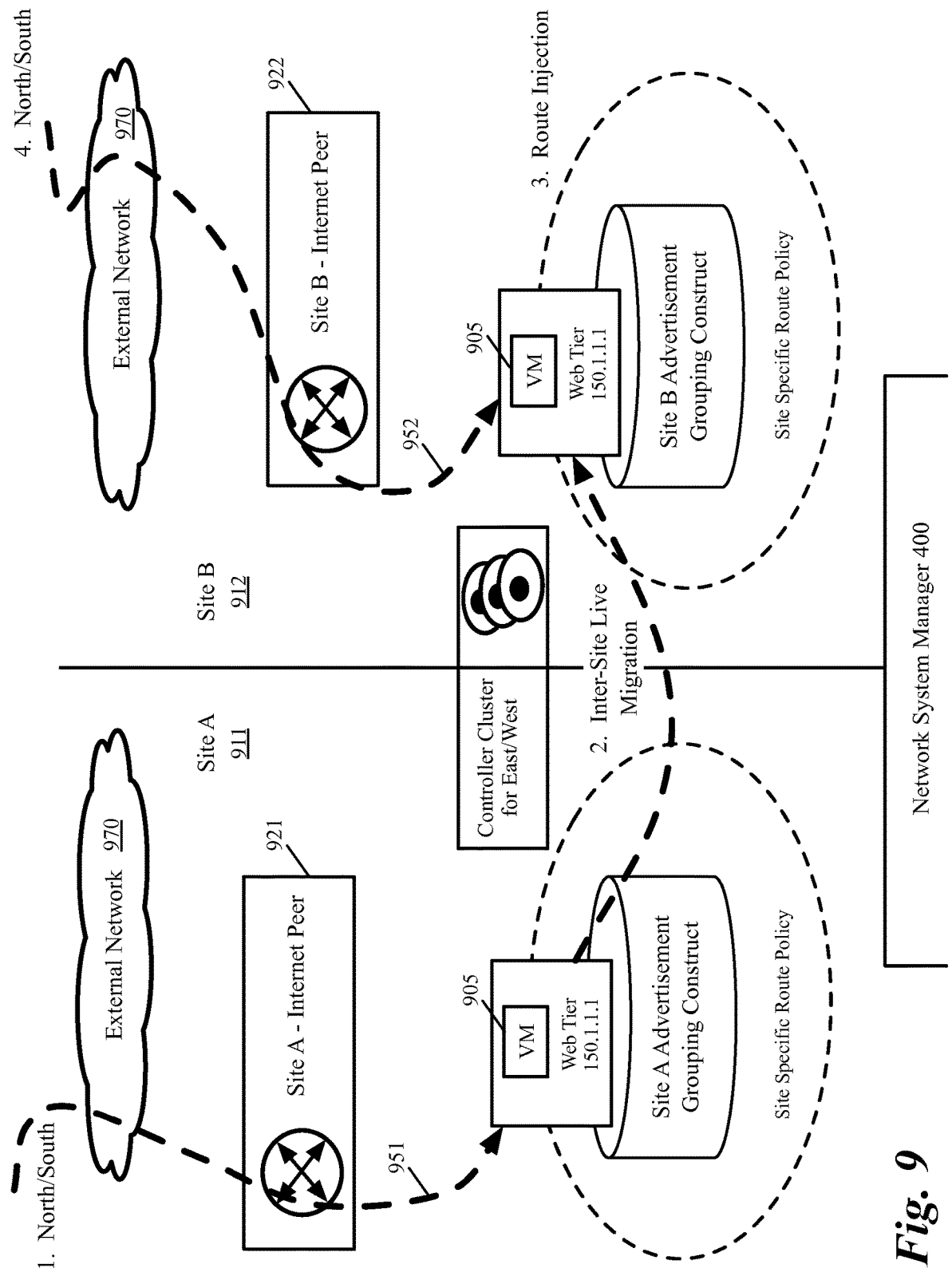
FIG. 9 conceptually illustrates a use case for an inter-site live migration of a VM in some embodiments of the invention.

FIG. 9 conceptually illustrates a use case for an inter-site live migration of a VM in some embodiments of the invention. In the prior art when an external facing VM (i.e., a VM that can be addressed by external networks) migrates from Site A to Site B, the incoming traffic directed to the VM arrives at Site A, which is then redirected to Site B. The redirection causes a suboptimal indirect path for delivering incoming packet traffic to the VM. As shown in FIG. 9, when VM 905 is in Site A 911, the incoming packet traffic is received at Site A Internet peer 921 and is directed to the VM 905 as shown by arrow 951.

After the live migration of the VM to Site B 912, the VM is advertised to Site B Internet peer 922 and a withdrawal message is sent to Site A Internet peer 921. Site A and Site B Internet peers advertise the updated routing policy to the external network 970. As a result, the ingress packets addressed to VM 905 is directly received at Site B Internet peer 921 as shown by the arrow 952.

All of the above-mentioned embodiments are applicable for the applications that are Internet facing (i.e., applications that have an IP address that is accessible by the external networks such as the Internet) as well as the applications that are internally facing (i.e., applications that have a private IP address that is not accessible through the external networks such as the Internet). If an application is externally facing and has a public IP address programmed into the guest operating system IPv4 properties. In this instance the public address is advertised to the border element router, which then updates the external networks. When the application has a private IP address and a network address translation (NAT) router does address translation, then the NAT translation is carried to the new site.

Figure 10:
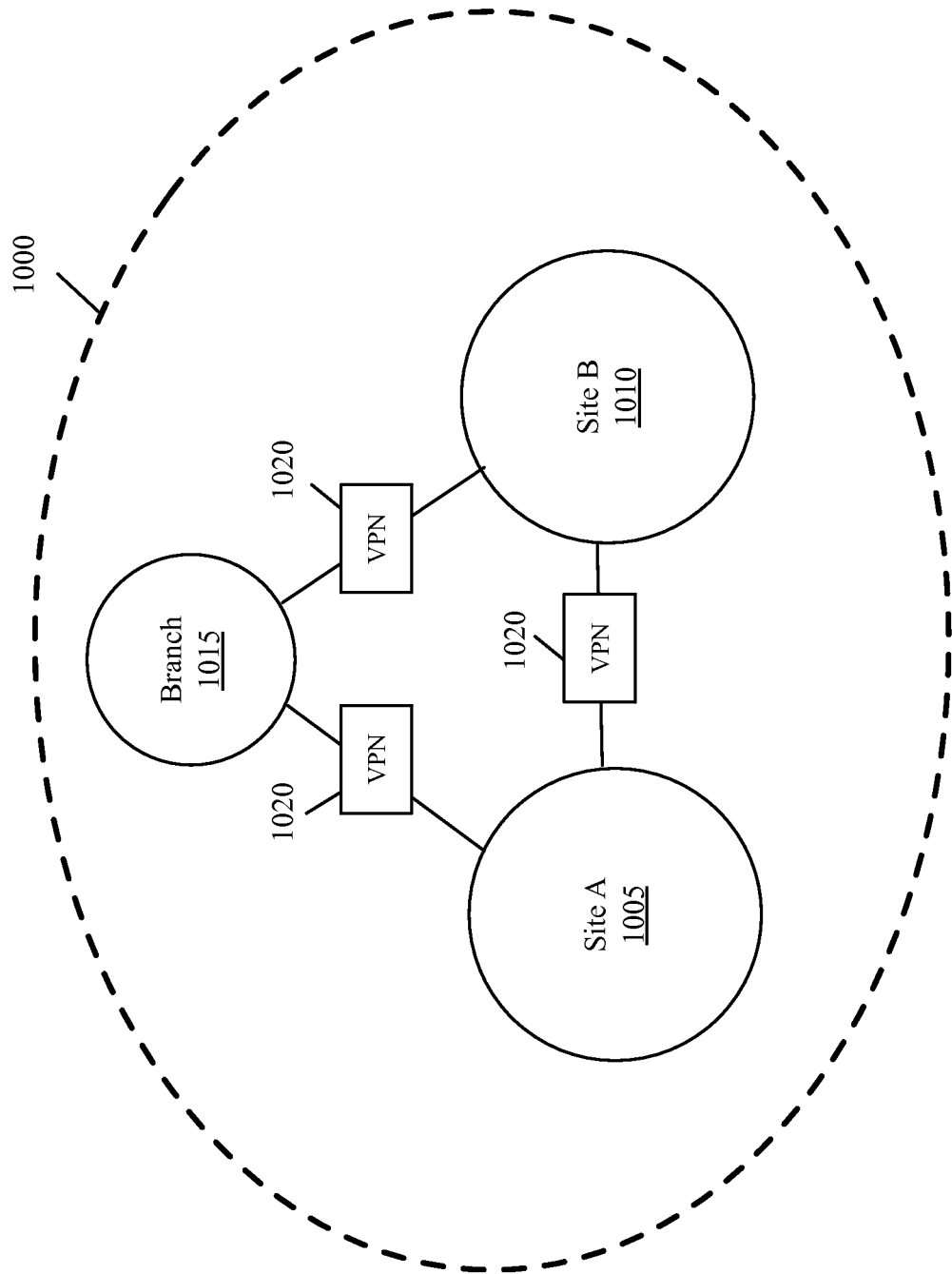
FIG. 10 conceptually illustrates a multi-site datacenter in some embodiments.

The above-mentioned embodiments are also applicable to applications with private addresses that are facing internally (i.e., the application is only accessible through the associated private network). FIG. 10 conceptually illustrates a multi-site datacenter 1000 in some embodiments. As shown, the datacenter 1000 includes sites 1005 and 1010 and one branch site 1015 (e.g., a remote office outside the data centers), which are connected with VPN 1020 or other circuits such as dark fiber layer 2, multiprotocol label switching (MPLS), etc. This means the private addresses are routable within the datacenter 1000 and enterprise network.

The embodiments of the invention provide ingress traffic optimization between these sites while still using private IP on the VM. Although the VMs are not Internet accessible, the VMs are used to service branch offices within the private network. For instance, for a VM that has IP 192.168.1.2, the branch site can reach the VM via Site A 1005. If the VM live migrates to Site B 1010, the networks routing tables are updated and the branch site can now communicate to Site B through route techniques described herein. The multi-site datacenters such as datacenter 1000 with many internal branch sites can be part of a private IP range, which is reachable across the private network circuits.

II. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 11:
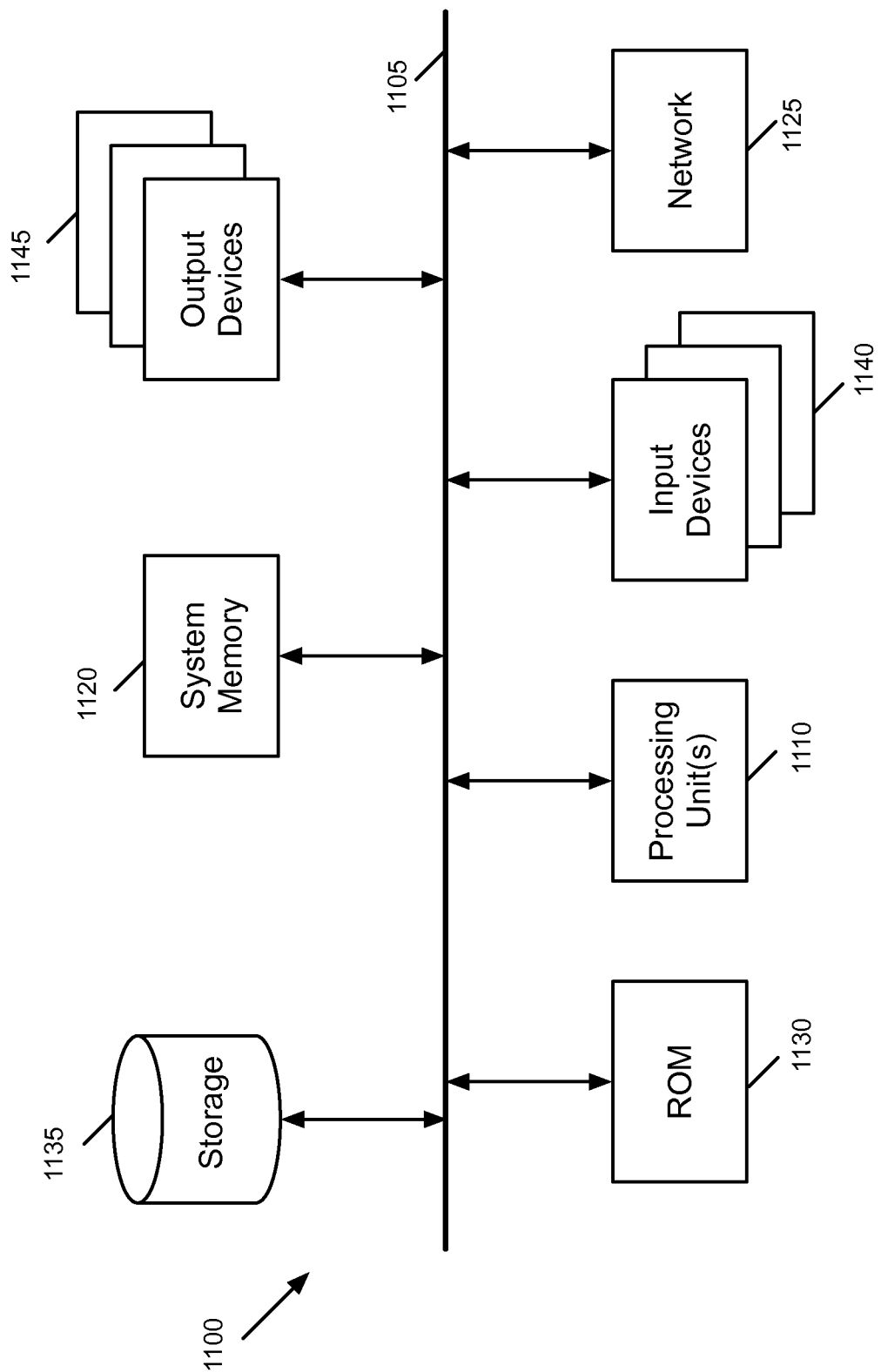
FIG. 11 conceptually illustrates an electronic system with which some embodiments of the invention are implemented.

FIG. 11 conceptually illustrates an electronic system 1100 with which some embodiments of the invention are implemented. The electronic system 1100 can be used to execute any of the control, virtualization, or operating system applications described above. The electronic system 1100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1100 includes a bus 1105, processing unit(s) 1110, a system memory 1120, a read-only memory (ROM) 1130, a permanent storage device 1135, input devices 1140, and output devices 1145.

The bus 1105 collectively represents all system, peripheral, and chipset buses that communicatively connect the numerous internal devices of the electronic system 1100. For instance, the bus 1105 communicatively connects the processing unit(s) 1110 with the read-only memory 1130, the system memory 1120, and the permanent storage device 1135.

From these various memory units, the processing unit(s) 1110 retrieve instructions to execute and data to process in order to execute the processes of the invention. The processing unit(s) may be a single processor or a multi-core processor in different embodiments.

The read-only-memory 1130 stores static data and instructions that are needed by the processing unit(s) 1110 and other modules of the electronic system. The permanent storage device 1135, on the other hand, is a read-and-write memory device. This device is a non-volatile memory unit that stores instructions and data even when the electronic system 1100 is off. Some embodiments of the invention use a mass-storage device (such as a magnetic or optical disk and its corresponding disk drive) as the permanent storage device 1135.

Other embodiments use a removable storage device (such as a floppy disk, flash drive, etc.) as the permanent storage device. Like the permanent storage device 1135, the system memory 1120 is a read-and-write memory device. However, unlike storage device 1135, the system memory is a volatile read-and-write memory, such a random access memory. The system memory stores some of the instructions and data that the processor needs at runtime. In some embodiments, the invention's processes are stored in the system memory 1120, the permanent storage device 1135, and/or the read-only memory 1130. From these various memory units, the processing unit(s) 1110 retrieve instructions to execute and data to process in order to execute the processes of some embodiments.

The bus 1105 also connects to the input and output devices 1140 and 1145. The input devices enable the user to communicate information and select commands to the electronic system. The input devices 1140 include alphanumeric keyboards and pointing devices (also called "cursor control devices"). The output devices 1145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 11, bus 1105 also couples electronic system 1100 to a network 1125 through a network adapter (not shown). In this manner, the computer can be a part of a network of computers (such as a local area network ("LAN"), a wide area network ("WAN"), or an Intranet, or a network of networks, such as the Internet. Any or all components of electronic system 1100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIG. 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of ingress traffic optimization in a datacenter comprising a plurality of sites, each site associated with a different network, the method comprising:

placing a unique identifier of each of a first set of data compute nodes (DCNs) located at a first site in a first route advertisement group associated with the first site;

retrieving Internet protocol (IP) addresses of each DCN in the first set using the unique identifier of the DCN, the IP address of a first DCN in the first set comprising a first network address corresponding to a first network associated with the first site;

advertising the IP addresses of the DCNs in the first route advertisement group to a routing peer associated with the first site;

determining that the first DCN has moved from the first site to a second site, the second site associated with a second network having a second network address different than the first network address;

in response to the determining, placing the unique identifier of the first DCN in a second route advertisement group associated with the second site; and advertising the IP address of the first DCN along with IP addresses of a second set of DCNs in the second route advertisement group to a routing peer associated with the second site.

2. The method of claim 1, wherein placing the unique identifier of a DCN in the first route advertisement group comprises placing the unique identifier of a DCN in the first route advertisement group only when the DCN is located at the first site and the DCN satisfies a set of criteria for being placed in a route advertisement group.

3. The method of claim 2, wherein the set of criteria comprises at least one of the DCN being addressable from a network outside the first site and the DCN is not provisioned to remain at the first site.

4. The method of claim 1, wherein retrieving the IP addresses of a DCN comprises querying a guest operating system associated with the DCN using the unique identifier of the DCN to retrieve the IP address of the DCN.

5. The method of claim 1 further comprising storing a mapping between the unique identifier and the retrieved IP address of each DCN at the first site, wherein advertising the IP addresses of the DCNs in the first route advertisement group comprises using the unique identifier of each DCN and the mapping to retrieve the IP address of each DCN in the first route advertisement group.

6. The method of claim 1 further comprising:

after determining that the first DCN has moved from the first site to the second site, removing the unique identifier of the first DCN from the first route advertisement group; and withdrawing the IP address of the DCN from the advertisement to the routing peer associated with the first site.

7. The method of claim 1, wherein the unique identifier of a DCN comprises one of a unique name associated with the DCN, a fully qualified domain name (FQDN) of an application running on the DCN, an identifier of a guest operating system associated with the DCN, and a metadata tag associated with the DCN.

8. The method of claim 1, wherein advertising the IP address of the first DCN to the routing peer associated with the second site causes the ingress traffic directed to the first DCN to be delivered to the routing peer associated with the second site despite the IP address of the first DCN having a different network address than the second network connected to the second site.

9. The method of claim 1, wherein determining that the first DCN has moved from the first site to a second site comprises:

receiving a notification that the first DCN has moved from a first host to a second host; and determining that the second host is associated with a site with a different site-specific identifier than the first site.

10. The method of claim 1, wherein the IP address of each DCN comprises a first field comprising said network address identifying a particular sub-network and a second field identifying a host connected to the particular sub-network.

11. A non-transitory machine readable medium storing a program for ingress traffic optimization in a datacenter comprising a plurality of sites, each site associated with a different network, the program comprising sets of instructions for:

placing a unique identifier of each of a first set of data compute nodes (DCNs) located at a first site in a first route advertisement group associated with the first site;

retrieving Internet protocol (IP) addresses of each DCN in the first set using the unique identifier of the DCN, the IP address of a first DCN in the first set comprising a first network address corresponding to a first network associated with the first site;

advertising the IP addresses of the DCNs in the first route advertisement group to a routing peer associated with the first site;

determining that the first DCN has moved from the first site to a second site, the second site associated with a second network having a second network address different than the first network address;

in response to the determining, placing the unique identifier of the first DCN in a second route advertisement group associated with the second site; and advertising the IP address of the first DCN along with IP addresses of a second set of DCNs in the second route advertisement group to a routing peer associated with the second site.

12. The non-transitory machine readable medium of claim 11, wherein the set of instructions for placing the unique identifier of a DCN in the first route advertisement group comprises a set of instructions for placing the unique identifier of a DCN in the first route advertisement group only when the DCN is located at the first site and the DCN satisfies a set of criteria for being placed in a route advertisement group.

13. The non-transitory machine readable medium of claim 12, wherein the set of criteria comprises at least one of the DCN being addressable from a network outside the first site and the DCN is not provisioned to remain at the first site.

14. The non-transitory machine readable medium of claim 11, wherein the set of instructions for retrieving the IP addresses of a DCN comprises a set of instructions for querying a guest operating system associated with the DCN using the unique identifier of the DCN to retrieve the IP address of the DCN.

15. The non-transitory machine readable medium of claim 11, the program further comprising a set of instructions for storing a mapping between the unique identifier and the retrieved IP address of each DCN at the first site, wherein the set of instructions for advertising the IP addresses of the DCNs in the first route advertisement group comprises a set of instructions for using the unique identifier of each DCN and the mapping to retrieve the IP address of each DCN in the first route advertisement group.

16. The non-transitory machine readable medium of claim 11, the program further comprising sets of instructions for:

removing, after determining that the first DCN has moved from the first site to the second site, the unique identifier of the first DCN from the first route advertisement group; and withdrawing the IP address of the DCN from the advertisement to the routing peer associated with the first site.

17. The non-transitory machine readable medium of claim 11, wherein the unique identifier of a DCN comprises one of a unique name associated with the DCN, a fully qualified domain name (FQDN) of an application running on the DCN, an identifier of a guest operating system associated with the DCN, and a metadata tag associated with the DCN.

18. The non-transitory machine readable medium of claim 11, wherein advertising the IP address of the first DCN to the routing peer associated with the second site causes the ingress traffic directed to the first DCN to be delivered to the routing peer associated with the second site despite the IP address of the first DCN having a different network address than the second network connected to the second site.

19. The non-transitory machine readable medium of claim 11, wherein the set of instructions for determining that the first DCN has moved from the first site to a second site comprises sets of instructions for:

receiving a notification that the first DCN has moved from a first host to a second host; and determining that the second host is associated with a site with a different site-specific identifier than the first site.

20. The non-transitory machine readable medium of claim 11, wherein the IP address of each DCN comprises a first field comprising said network address identifying a particular sub-network and a second field identifying a host connected to the particular sub-network.

\* \* \* \* \*